(12) United States Patent
Mutter et al.

(10) Patent No.: US 11,489,694 B2
(45) Date of Patent: Nov. 1, 2022

(54) DEVICE FOR A USER STATION OF A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/298,297

(22) PCT Filed: Dec. 11, 2019

(86) PCT No.: PCT/EP2019/084606
§ 371 (c)(1),
(2) Date: May 28, 2021

(87) PCT Pub. No.: WO2020/120553
PCT Pub. Date: Jun. 18, 2020

(65) Prior Publication Data
US 2022/0029850 A1    Jan. 27, 2022

(30) Foreign Application Priority Data
Dec. 13, 2018   (DE) .......................... 102018221680.0

(51) Int. Cl.
*H04L 12/40*   (2006.01)
(52) U.S. Cl.
CPC .. *H04L 12/40013* (2013.01); *H04L 12/40039* (2013.01); *H04L 12/40097* (2013.01); *H04L 2012/40215* (2013.01)
(58) Field of Classification Search
CPC ......... H04L 12/40013; H04L 12/40039; H04L 12/40097
See application file for complete search history.

(56) References Cited

U.S. PATENT DOCUMENTS 8,989,210 B2 *   3/2015   Hartwich .......... H04L 12/40039
                                                                  370/458
2018/0205572 A1*  7/2018   Kishigami ........ H04L 12/40169
(Continued)

FOREIGN PATENT DOCUMENTS

DE   112016003218 T5   4/2018
DE   102016224961 A1   6/2018

OTHER PUBLICATIONS

International Search Report for PCT/EP2019/084606, dated Mar. 18, 2020.
ISO 11898-1:2015 Standard, 2015, pp. 1-74.

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A device for a serial bus system. The device includes a receiver for receiving a signal from a bus of the bus system, in which bus system at least one first communication phase and one second communication phase are used for exchanging messages between user stations of the bus system. For a message, the bus states of the signal received from the bus in the first communication phase are different from bus states of the signal received in the second communication phase. The receiver is designed to generate a digital signal from the signal received from the bus and to output the signal to a communication control device which evaluates data contained in the digital signal. The receiver uses a first reception threshold and a second reception threshold in each of the communication phases for generating the digital signal, and the second reception threshold has a negative voltage value.

14 Claims, 4 Drawing Sheets

(56) References Cited

U.S. PATENT DOCUMENTS

2020/0160624 A1\* 5/2020 Yamashita ............ G05D 1/0248
2020/0195239 A1\* 6/2020 Wang ..................... H03K 3/017

\* cited by examiner

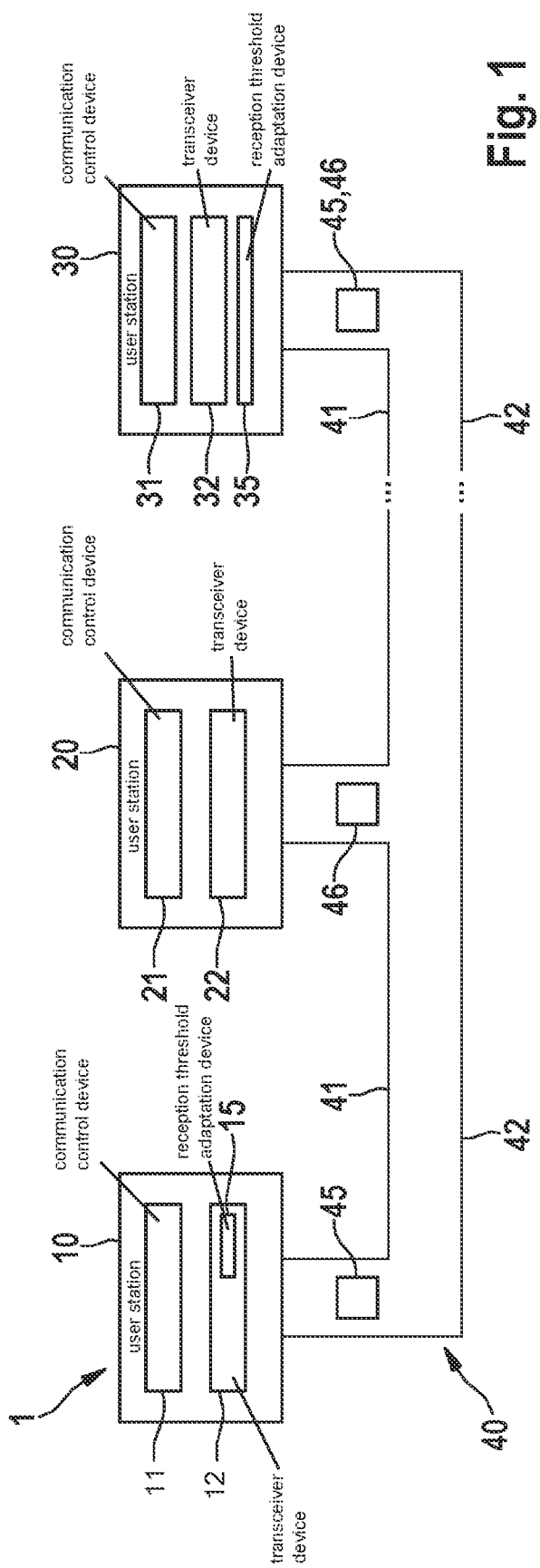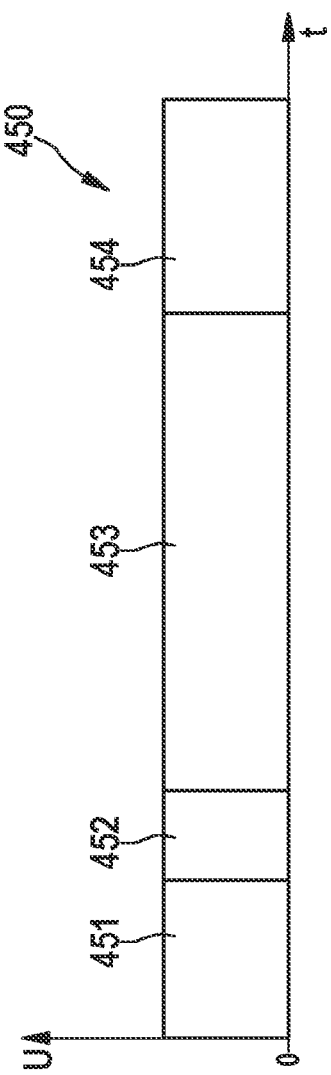

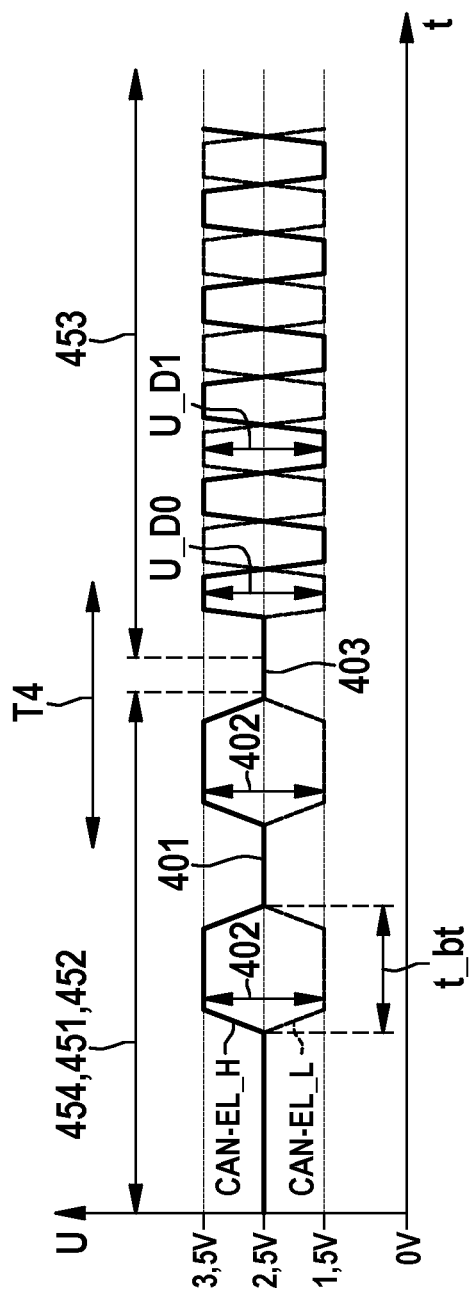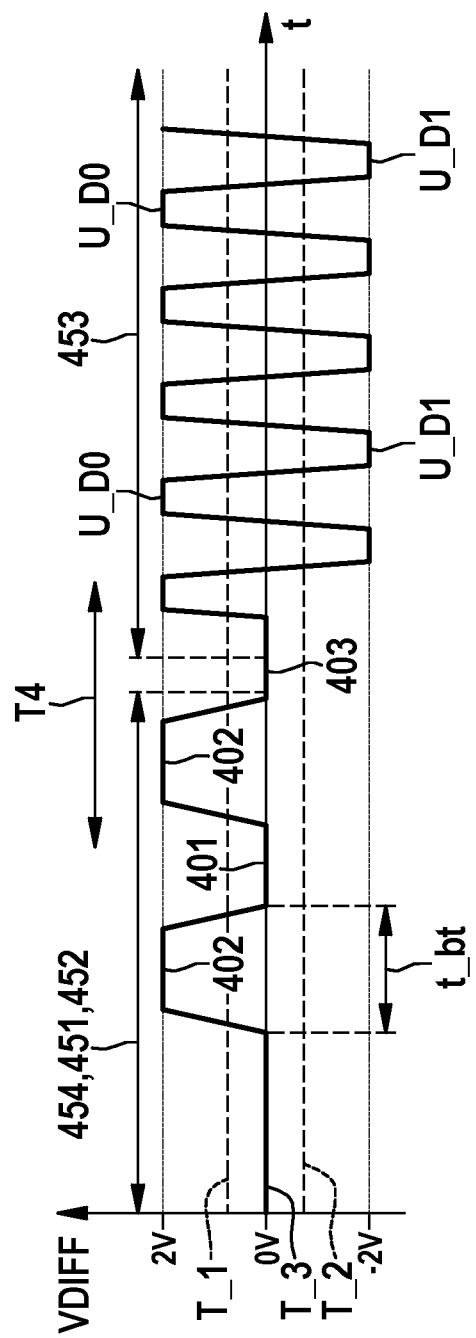

DEVICE FOR A USER STATION OF A SERIAL BUS SYSTEM, AND METHOD FOR COMMUNICATING IN A SERIAL BUS SYSTEM

FIELD

The present invention relates to a device for a user station of a serial bus system, and a method for communicating in a serial bus system that operates with a high data rate and a high level of error robustness.

BACKGROUND INFORMATION

For the communication between sensors and control units, for example in vehicles, a bus system is frequently used in which data are transferred as messages under the ISO 11898-1:2015 standard, as a CAN protocol specification with CAN FD. The messages are transferred between the bus users of the bus system, such as the sensor, control unit, transducer, etc.

With the increasing number of functions of a technical facility or of a vehicle, the data traffic in the bus system also increases. Moreover, it is often necessary for the data to be transferred from the transmitter to the receiver more quickly than previously. As a result, the required bandwidth of the bus system is further increased.

To allow data to be transferred at a higher bit rate than with CAN, an option has been provided in the CAN FD message format for changing over to a higher bit rate within a message. In such technologies, the maximum possible data rate is increased beyond a value of 1 Mbit/s by using higher clocking in the area of the data fields. Such messages are also referred to below as CAN FD frames or CAN FD messages. With CAN FD, the useful data length of 8 bytes is increased up to 64 bytes, and the data transfer rates are much higher than with CAN.

Even though a CAN- or CAN FD-based communications network provides a very large number of advantages with regard to its robustness, for example, its speed is much slower compared to a data transfer via 100 Base-T1 Ethernet, for example. In addition, the useful data length of up to 64 bytes, achieved thus far with CAN FD, is too small for some applications.

SUMMARY

An object of the present invention is to provide a device for a user station of a serial bus system, and a method for communicating in a serial bus system, which solve the above-mentioned problems. In particular, an object of the present invention is to provide a device for a user station of a serial bus system, and a method for communicating in a serial bus system in which a high data rate and an increase in the quantity of the useful data per frame may be achieved with a high level of error robustness.

The object may be achieved by a device for a user station of a serial bus system in accordance with an example embodiment of the present invention. In accordance with an example embodiment of the present invention, the device includes a receiver for receiving a signal from a bus of the bus system, in which bus system at least one first communication phase and one second communication phase are used for exchanging messages between user stations of the bus system, for a message the bus states of the signal received from the bus in the first communication phase being different from bus states of the signal received in the second communication phase, the receiver being designed to generate a digital signal from the signal received from the bus and to output the signal to a communication control device that evaluates data contained in the digital signal, the receiver being designed to use a first reception threshold and a second reception threshold in each of the communication phases for generating the digital signal, and the second reception threshold having a negative voltage value.

An automatic optimization of the reception threshold for various communication phases on the bus is possible due to the design of the device. As a result, the reception threshold for each of the communication phases is ideal, so that the bit times in the various communication phases on the bus are not distorted.

As a result, a reception of the frames with a low error rate may be ensured using the transceiver device, even with an increased quantity of the useful data per frame. Thus, communication may also take place in the serial bus system with a high level of error robustness when a high data rate and an increase in the quantity of the useful data per frame occur.

Therefore, by use of the transceiver device in the bus system it is possible in particular to maintain an arbitration from CAN in a first communication phase and still increase the transfer rate considerably compared to CAN or CAN FD.

This contributes toward achieving a net data rate of at least 10 Mbps. In addition, the quantity of the useful data may be up to 4096 bytes per frame.

The method in accordance with an example embodiment of the present invention carried out by the user station may also be used when at least one CAN user station and/or at least one CAN FD user station that transmit(s) messages according to the CAN protocol and/or CAN FD protocol are/is present in the bus system.

Advantageous further embodiments of the user station in accordance with the present invention are disclosed herein.

According to the exemplary embodiments of the present invention, the receiver is designed to use the second reception threshold, regardless of the communication phase in which the signal is received from the bus, the receiver being designed to additionally use the first reception threshold in the first communication phase for generating the digital signal, and in the second communication phase to use a third reception threshold whose positive voltage value is less than the positive voltage value of the first reception threshold.

According to one particular embodiment variant of the present invention, the bus states of the signal received from the bus in the first communication phase are generated with a different physical layer than the bus states of the signal received in the second communication phase.

According to another particular embodiment variant of the present invention, in the first communication phase, bits of the signals have a bit time that is greater by at least a factor of 10 than a bit time of bits that are driven in the second communication phase.

The communication phases on the bus possibly differ in that in the first communication phase, it is negotiated which of the user stations of the bus system in the subsequent second communication phase obtains, at least temporarily, exclusive, collision-free access to the bus.

The device possibly also includes a reception threshold adaptation device for evaluating the signal received from the bus with regard to the communication phase present at that time, and for switching the first reception threshold over to the third reception threshold or for switching the third reception threshold over to the first reception threshold, based on the result of the evaluation.

It is possible for the reception threshold adaptation device to switch the first reception threshold over to the third reception threshold when, after the first communication phase, in which no exclusive, collision-free access of a user station to the bus of the bus system is ensured, a switch is made over to the communication phase with the exclusive, collision-free access to the bus.

According to one option of the present invention, the reception threshold adaptation device is designed to form an average value of a differential voltage of two signals received from the bus in order to switch the first reception threshold over to the third reception threshold or to switch the third reception threshold over to the first reception threshold.

In accordance with an example embodiment of the present invention, the device may also include a transmitter for transmitting messages onto a bus of the bus system, the transmitter being designed to switch between a first operating mode and a second operating mode during transmission of the various communication phases of a message. In the first operating mode, the transmitter is possibly designed to generate a first data state as a bus state with different bus levels for two bus wires of the bus line, and a second data state as a bus state with the same bus level for the two bus wires of the bus line, and in the second operating mode the transmitter being designed to generate the first and second data states in each case as a bus state with different bus levels for the two bus wires of the bus line.

The device described above may be part of a user station for a serial bus system, the user station also including a communication control device for controlling a communication of the user station with at least one other user station of the bus system.

There is an option for the communication control device to be designed to transmit a signal to the device, the device being designed to switch the first reception threshold over to the third reception threshold or to switch the third reception threshold over to the first reception threshold, based on the signal transmitted from the communication control device.

The user station described above may be part of a user station of a bus system which also includes a bus and at least two user stations that are connected to one another via the bus in such a way that they may communicate serially with one another. At least one of the at least two user stations is a user station described above.

Moreover, the object stated above is achieved by a method for communicating in a serial bus system according to an example embodiment of the present invention. In accordance with an example embodiment of the present invention, the method is carried out using a receiver for receiving a signal from a bus of the bus system, in which bus system at least one first communication phase and one second communication phase are used for exchanging messages between user stations of the bus system, and the receiver carrying out the steps: receiving a signal from the bus of the bus system, for a message the bus states of the signal received from the bus in the first communication phase being different from bus states of the signal received in the second communication phase, generating a digital signal from the signal received from the bus, and outputting the generated digital signal to a communication control device that evaluates data contained in the digital signal, the receiver using a first reception threshold and a second reception threshold in each of the communication phases during generating the digital signal, and the second reception threshold having a negative voltage value.

The method yields the same advantages as stated above with regard to the device.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figure, and based on exemplary embodiments.

FIG. 1 shows a simplified block diagram of a bus system according to a first exemplary embodiment of the present invention.

FIG. 2 shows a diagram for illustrating the design of messages that may be transmitted from a transceiver device for a user station of the bus system according to the first exemplary embodiment of the present invention.

FIG. 4 shows a temporal profile of bus signals CAN EL_H and CAN EL_L for the user station according to the first exemplary embodiment of the present invention.

FIG. 5 shows a temporal profile of a differential voltage VDIFF of bus signals CAN EL_H and CAN EL_L for the user station according to the first exemplary embodiment of the present invention.

Unless stated otherwise, identical or functionally equivalent elements are provided with the same reference numerals in the figures.

DETAILED DESCRIPTION OF EXAMPLE EMBODIMENTS

Figure 3:
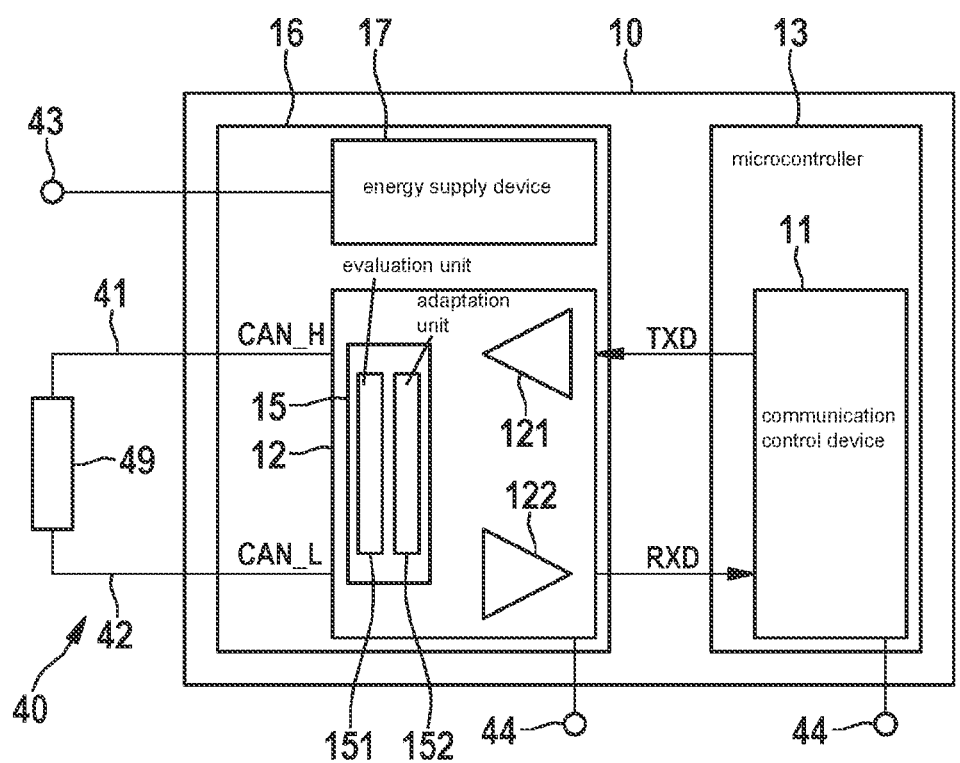
FIG. 3 shows a simplified schematic block diagram of a user station of the bus system according to the first exemplary embodiment of the present invention.

FIG. 1 shows as an example a bus system 1 that is in particular the basis for the design of a CAN bus system, a CAN FD bus system, a CAN EL bus system, and/or modifications thereof, as described below. Bus system 1 may be used in a vehicle, in particular a motor vehicle, an aircraft, etc., or in a hospital, and so forth In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L, and are used for electrical signal transfer after coupling in the dominant levels or generating recessive levels for a signal in the transmission state. Messages 45, 46 in the form of signals are serially transferable between individual user stations 10, 20, 30 via bus 40. User stations 10, 20, 30 are, for example, control units, sensors, display devices, etc., of a motor vehicle.

As shown in FIG. 1, user station 10 includes a communication control device 11, a transceiver device 12, and a reception threshold adaptation device 15. In contrast, user station 20 includes a communication control device 21 and a transceiver device 22. User station 30 includes a communication control device 31, a transceiver device 32, and a reception threshold adaptation device 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control device 11 creates and reads first messages 45, which are modified CAN messages 45, for example. Modified CAN messages 45 are built up based on a CAN EL format, described in greater detail with reference to FIG. 2.

Communication control device 21 may be designed as a conventional CAN controller. Communication control device 21 creates and reads second messages 46, for example conventional CAN messages 46. Conventional CAN messages 46 are built up according to the conventional base format, in which a number of up to 8 data bytes may be included in message 46. Alternatively, conventional CAN message 46 is built up as a CAN FD message, in which a number of up to 64 data bytes, which are also transferred at a much faster data rate than with conventional CAN message 46, may be included. In the latter case, communication control device 21 is designed as a conventional CAN FD controller.

Communication control device 31 may be designed to provide a CAN EL message 45 or a conventional CAN message 46 for transceiver device 32 or receive it from same, as needed. Communication control device 31 thus creates and reads a first message 45 or second message 46, first and second messages 45, 46 differing by their data transmission standard, namely, CAN EL or CAN in this case. Alternatively, conventional CAN message 46 is built up as a CAN FD message. In the latter case, communication control device 31 is designed as a conventional CAN FD controller.

Except for the differences described in greater detail below, transceiver device 12 may be designed as a CAN EL transceiver. Transceiver device 22 may be designed as a conventional CAN transceiver or as a CAN FD transceiver. Transceiver device 32 may be designed to provide messages 45 according to the CAN EL format or messages 46 according to the present CAN base format for communication control device 31 or receive the messages from same, as needed. Additionally or alternatively, transceivers 12, 32 may be designed as a conventional CAN FD transceiver.

A formation and then transfer of messages 45 having the CAN EL format, in addition to the reception of such messages 45, is achievable by use of the two user stations 10, 30.

FIG. 2 shows for message 45 a CAN EL frame 450, which is transmitted from transceiver device 12 or transceiver device 32. For the CAN communication on bus 40, CAN EL frame 450 is divided into different communication phases 451 through 454, namely, an arbitration phase 451, an SoD phase 452, a data phase 453, and a frame end phase 454.

In arbitration phase 451, for example at the start a bit is transmitted, which is also referred to as an SOF bit and which indicates the start of frame. An identifier including 32 bits, for example, for identifying the sender of message 45 is also transmitted in arbitration phase 451. During the arbitration, with the aid of the identifier, bit-by-bit negotiation is carried out between user stations 10, 20, 30 concerning which user station 10, 20, 30 would like to transmit message 45, 46 having the highest priority, and therefore for the next time period for transmitting in SoD phase 452 and subsequent data phase 453, obtains exclusive access to bus 40 of bus system 1.

In SoD phase 452, a piece of protocol format information made up of one or multiple bits is optionally transmitted which is suitable for distinguishing CAN EL frames from CAN frames or CAN FD frames. However, this piece of protocol format information does not absolutely have to be present.

In addition, in SoD phase 452 a data length code that is 13 bits long, for example, is transmitted, which may then, for example, take on values of 1 to up to 4096 by an increment of 1, or alternatively may take on values of 0 to 4095. The data length code may also include fewer or more bits, and the increment may take on other values.

The useful data of the CAN EL frame or of message 45 are transmitted in data phase 453. The useful data may include up to 4096 bytes, for example, or a greater value, corresponding to the value range of the data length code.

In frame end phase 454, a check sum of the data of data phase 453 may be contained in a check sum field, for example, including the stuff bits that are inserted as an inverse bit by the sender of message 45 in each case after a predetermined number of identical bits, in particular 10 identical bits. In addition, in frame end phase 454 at least one acknowledge bit may be contained in an end field. Furthermore, a sequence of 11 identical bits that indicate the end of CAN EL frame 450 may be present. By use of the at least one acknowledge bit, it may be communicated whether or not a receiver has found an error in received CAN EL frame 450 or message 45.

A physical layer, similarly as with CAN and CAN FD, is used at least in arbitration phase 451 and frame end phase 454. In addition, in SoD phase 452 a physical layer, similarly as with CAN and CAN FD, may be used at least in part, i.e., at the start. The physical layer corresponds to the bit transfer layer or layer one of the conventional Open Systems Interconnection (OSI) model.

An important point during these phases 451, 454 and the at least one portion of SoD phase 452 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

A sender of message 45 starts a transmission of bits of SoD phase 452 and of subsequent data phase 453 onto bus 40 only after user station 10, as the sender, has won the arbitration, and user station 10, as the sender, thus has exclusive access to bus 40 of bus system 1 for the transmission. The sender may either switch to the faster bit rate and/or the other physical layer after a portion of SoD phase 452, or may switch to the faster bit rate and/or the other physical layer only with the first bit, i.e., at the start, of subsequent data phase 453.

In general, in the bus system with CAN EL, in comparison to CAN or CAN FD in particular the following deviant properties may be achieved:

a) acquiring and optionally adapting proven properties that are responsible for the robustness and user-friendliness of CAN and CAN FD, in particular a frame structure including identifiers and arbitration according to the CSMA/CR method, b) increasing the net data transfer rate to approximately 10 megabits per second, c) increasing the quantity of the useful data per frame to approximately 4 kbytes, d) optionally, completely or partially dispensing with the sending of error frames when errors are detected. However, with transceiver devices 12, 32 it is possible for error frames to be further used, since the bus state transitions in the data phase are influenced only very briefly. Thus, error frames are able to dominate over the instantaneous bus traffic (6× dominant in succession), as required. This is advantageous from the standpoint of the user.

FIG. 3 shows the basic design of user station 10 together with communication control device 11, transceiver device 12, and reception threshold adaptation device 15. User station 30 has a design similar to that shown in FIG. 3, except that reception threshold adaptation device 35 is not integrated into transceiver device 32, but, rather, provided separately from communication control device 31 and transceiver device 32. Therefore, user station 30 and reception threshold adaptation device 35 are not separately described. The functions of device 15 described below are present in an identical form for device 35.

According to FIG. 3, in addition to communication control device 11, transceiver device 12, and device 15, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V. However, energy supply device 17 may supply some other voltage having a different value, as needed.

Additionally or alternatively, energy supply device 17 may be designed as a power source. Reception threshold adaptation device 15 includes an evaluation unit 151 and an adaptation unit 152.

Transceiver device 12 also includes a transmitter 121 and a receiver 122. Even though transceiver device 12 is consistently referred to below, it is alternatively possible to provide receiver 122 in a separate device externally from transmitter 121. Transmitter 121 and receiver 122 may be designed as a conventional transceiver device 22. Transmitter 121 may in particular include at least one operational amplifier and/or one transistor. Receiver 122 may in particular include at least one operational amplifier and/or one transistor.

Transceiver device 12 is connected to bus 40, or more precisely, to its first bus wire 41 for CAN_H and its second bus wire 42 for CAN_L. The voltage supply for energy supply device 17 for supplying first and second bus wires 41, 42 with electrical energy, in particular with voltage CAN_Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmitter 121 and to receiver 122, even though the connection in FIG. 3 is not shown for simplification. In transceiver device 12, first and second bus wires 41, 42 are also connected to device 15.

During operation of bus system 1, transmitter 121 converts a transmission signal TxD of communication control device 11 into corresponding signals CAN EL_H and CAN EL_L for bus wires 41, 42, and transmits these signals CAN EL_H and CAN EL_L onto bus 40 at the terminals for CAN_H and CAN_L, as shown in FIG. 4.

Receiver 122 forms a reception signal RxD from signals CAN EL_H and CAN EL_L according to FIG. 4 that are received from bus 40, and passes it on to communication control device 11, as shown in FIG. 3. With the exception of an idle or standby state, transceiver device 12 with receiver 122 during normal operation always listens to a transfer of data or messages 45, 46 on bus 40, in particular regardless of whether or not transceiver device 12 is the sender of message 45.

According to the example of FIG. 4, signals CAN EL_H and CAN EL_L in above-mentioned communication phases 451, 452, 454 have dominant and recessive bus levels 401, 402, in accordance with CAN. In contrast, signals CAN EL_H and CAN EL_L in data phase 453 differ from conventional signals CAN_H and CAN_L, as described in greater detail below. A difference signal VDIFF=CAN EL_H−CAN EL_L shown in FIG. 5 forms on bus 40.

As is discernible from the left portion of FIG. 4, transmitter 121 drives dominant states 402 of differential signals CAN EL_H, CAN EL_L differently only in above-mentioned communication phases 451, 452, 454. In contrast, the bus levels on bus line 3 for recessive states 401 in above-mentioned communication phases 451, 452, 454 are equal to voltage Vcc or CAN_Supply of approximately 2.5 V, for example. Thus, a value of 0 V results for a voltage VDIFF=CAN EL_H−CAN EL_L for recessive states 401 (logical "0" of transmission signal TxD), and a value of approximately 2.0 V results for dominant states 402 (logical "1" of transmission signal TxD).

If transceiver device 12, in particular its device 15, detects the end of arbitration phase 451 or SoD phase 452, for data phase 453, transmitter 121 is switched over from the state shown in the left portion of FIG. 4 into the state shown in the right portion of FIG. 4. Transmitter 121 is thus switched over from a first operating mode into a second operating mode.

According to the right portion of FIG. 4, in faster data phase 453, for signals CAN EL_H, CAN EL_L after the switchover from the state of communication phases 451, 452, 454 an idle state 403, in which in the particular example of FIG. 4 a bus level of approximately 0 V results, is reached directly after the switchover. However, after the switchover into data phase 453, the state of a bus level of approximately 0 V generally will no longer occur. Subsequently, optionally after reaching an idle state, not illustrated, in particular with a bus level of approximately 2.5 V, bus states U_D0, U_D1 corresponding to data states Data_0 and Data_1 of transmission signal TxD are reached.

The sequence of data states Data_0 and Data_1, and thus of resulting bus states U_D0, U_D1 for signals CAN EL_H, CAN EL_L in FIG. 4 and the resulting profile of voltage VDIFF from FIG. 5, is used only to illustrate the function of transceiver device 10. The sequence of data states Data_0 and Data_1 and thus of bus states U_D0, U_D1 is selectable as needed.

According to FIG. 4, signal CAN EL_L for bus state U_D0 is "pulled" to approximately 1.5 V, corresponding to data state Data_0, in particular using an NMOS transistor of transmitter 121. In contrast, signal CAN EL_H for bus state U_D0 is "pulled" to approximately 3.5 V, corresponding to data state Data_0, in particular using a PMOS transistor of transmitter 121. Data_1 is reached by "pulling" signal CAN EL_L to approximately 3.5 V, in particular using a PMOS transistor, and "pulling" signal CAN EL_H to approximately 1.5 V, in particular using an NMOS transistor.

In the states shown in FIG. 4 and described above, on the bus line of bus 40, bus levels between approximately −0.6 V and approximately −2 V are present for state Data_0, and bus levels between approximately 0.6 V and approximately 2 V are present for state Data_1, as illustrated in FIG. 5. Thus, for states Data_0 and Data_1, differential voltage VDIFF=CAN EL_H−CAN EL_L has in particular a maximum amplitude of approximately 1.4 V, even though FIG. 5 illustrates an amplitude for VDIFF as 2 V in a particular example.

In other words, in a first operating mode according to FIG. 4, transmitter 121 generates a first data state, for example Data_0, as bus state 402 with different bus levels for two bus wires 41, 42 of the bus line, and a second data state, for example Data_1, as bus state 401 with the same bus level for the two bus wires 41, 42 of the bus line of bus 40.

In addition, for the temporal profiles of signals CAN EL_H, CAN EL_L in a second operating mode that includes data phase 453, transmitter 121 forms first and second data states Data_0, Data_1 as bus state U_D0, U_D1, respectively, with different bus levels for the two bus wires 41, 42 of the bus line of bus 40.

As illustrated in FIG. 5, in communication phases 451, 452, 454, receiver 122 uses first reception threshold T_1 with the typical position of 0.7 V, in accordance with CAN/CAN FD, to be able to reliably recognize bus states 401, 402 in the first operating mode. In addition, in communication phases 451, 452, 454, receiver 122 uses a second reception threshold T_2 that is below 0 V, as shown in FIG. 5. In the example of FIG. 5, second reception threshold T_1 is at approximately −0.7 V.

Device 15 with its evaluation unit 151 evaluates second reception threshold T_2 during each of communication phases 451 through 454. If it is established that the value drops below reception threshold T_2 for a predetermined time period T4, evaluation unit 151 assumes that data phase 453 has begun, and outputs the result to adaptation unit 152. Thus, adaptation unit 152 adapts first reception threshold T_1 for data phase 453, previously used for communication phases 451, 452, 454, to a third reception threshold T_3. In other words, adaptation unit 152 switches first reception threshold T_1, used for communication phases 451, 452, 454, over to third reception threshold T_3 for data phase 453.

Thus, in data phase 453, evaluation unit 151 now uses second and third reception thresholds T_2, T_3 for assessing the received data in signals CAN EL_H, CAN EL_L. In the example from FIG. 5, third reception threshold T_3 is typically at approximately 0 V, and is thus ideal for the levels of differential voltage VDIFF in data phase 453 in the example from FIG. 5.

FIGS. 4 and 5 each show a very particular example of predetermined time period T4. Predetermined time period T4, which may also be referred to as filter time t_filter, is stored at least temporarily in evaluation unit 151. For the design of predetermined time period T4, a typical time period of interferences on bus 40, also referred to as t_interference, and a bit time period t_bt that indicates the temporal duration of a bits in signals CAN EL_H, CAN EL_L of communication phase 451 through 454 present at that time, are taken into account. Thus, in particular t_interference<T4<t_bt is valid for the design of predetermined time period T.

The bit rate in arbitration phase 451, in frame end phase 454, and at least partially in the SoD phase is selected to be slower than in data phase 453 of frame 450. In particular, the bit rate in phases 451, 452, 454 is selected as 500 kbit/s, resulting in a bit time of approximately 2 μs, whereas the bit rate in data phase 453 is selected as 5 to 8 Mbit/s, resulting in a bit time of approximately 0.2 μs and shorter. Bit time t_bt of the signals in the other communication phases 451, 452, 454 is thus greater than the bit time of the signal in data phase 453 by at least a factor of 10.

For the time of the transition from communication phase 451 or 452 to data phase 453, data reception with the aid of first and second reception thresholds T_1, T_2 is possible, although not with an ideal position of the reception threshold.

Thus, also in data phase 453, in which third reception threshold T_3 is used for generating reception signal RxD, the voltage values of signals CAN EL_H, CAN EL_L or of voltage VDIFF in relation to second reception threshold T_2 are observed using evaluation unit 151. Using the result, evaluation unit 151 may make the decision of when frame end phase 454 begins, in which adaptation unit 152 is to again switch third reception threshold T_3 over to first reception threshold T_1.

If in data phase 453, evaluation unit 151 establishes that the voltage values of signals CAN EL_H, CAN EL_L do not drop below third reception threshold T_3 for a predetermined time period T5, adaptation unit 152 again switches third reception threshold T_3, previously used for communication phases 453, over to first reception threshold T_1. After this adaptation of the reception thresholds, first and second reception thresholds T_1, T_2 are once again used for evaluating the voltage values of signals CAN EL_H, CAN EL_L.

Predetermined time period T5 is selected to be at least large enough so that bus 40 may be in an identical state. This is the case in particular for a bit time period t_bt. In particular, predetermined time period T5 and predetermined time period T4 may have equal lengths.

In general, bus states 401, 402, U_D1, U_D2 may thus be different in at least two communication phases of various communication phases 451 through 454, and in particular at least two different physical layers may be used for this purpose. Transceiver device 12, in particular its device 15, may make an automatic switchover of reception thresholds T_1, T_2 to reception thresholds T_2, T_3 as a function of communication phases 451 through 454 present at that time, which differ in at least one feature for generating the two bus states 401, 402, or the two bus states U_D1, U_D2 that are different from same.

Due to the described switchover of transmitter 121 and of reception thresholds T_1, T_2, T_3 for receiver 122, much higher data rates may be achieved in data phase 453 than with CAN or CAN FD. In addition, the data length in a data field of data phase 453 may be increased up to 4096 bytes. As a result, the advantages of CAN with regard to the arbitration may be retained, yet a higher volume of data may be effectively transferred in a shorter time period than previously without the need for repeating the data due to an error, as explained below.

A further advantage is that error frames in bus system 1 are not necessary during the transfer of messages 45. Messages 45 are thus no longer destroyed, which eliminates the need for a double transfer of messages. The net data rate increases as a result.

Figure 6:
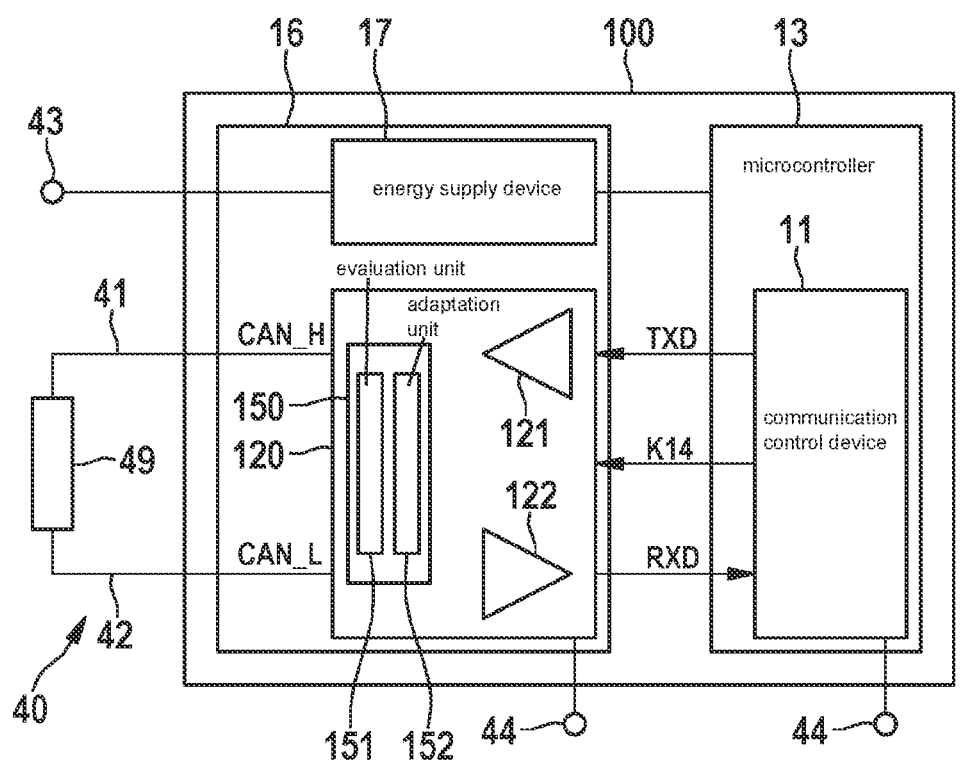
FIG. 6 shows a simplified schematic block diagram of a user station of the bus system according to a second exemplary embodiment of the present invention.

FIG. 6 shows a user station 100 that includes a reception threshold adaptation device 150 according to a second exemplary embodiment. User station 100 may be used instead of user station 10.

In user station 100, communication control device 11 includes an additional terminal for outputting a signal K14 to transceiver device 12, in particular its reception threshold adaptation device 150. In this case, evaluation unit 151 evaluates the value of signal K14 in order to switch reception thresholds T_1, T_2 over to reception thresholds T_2, T_3, or to switch reception thresholds T_2, T_3 over to reception thresholds T_1, T_2.

Optionally, evaluation unit 151 may additionally carry out an evaluation of the signals from FIG. 4 and/or FIG. 5, as described above. A plausibility check may take place in order to further increase the reliability of the switchover. In particular, the evaluations of the signals from FIG. 4 and/or FIG. 5 or of signal K14 may be given a higher weight in the plausibility check.

For example, evaluation unit 151 may be designed as a switching block, in particular as at least one transistor, that switches reception thresholds T_1, T_2, T_3 of receiver 122 based on the value of signal K14, as described above.

Otherwise, in the second exemplary embodiment, bus system 1 is designed in the same way as described above for the first exemplary embodiment.

According to a third exemplary embodiment, evaluation unit 151 of user station 10 may use a low pass-filtered bus differential voltage VDIFF, in particular may carry out an average value formation of voltage VDIFF, in order to switch reception thresholds T_1, T_2 over to reception thresholds T_2, T_3, or to switch reception thresholds T_2, T_3 over to reception thresholds T_1, T_2.

In the example from FIGS. 4 and 5, the average value of bus differential voltage VDIFF in communication phases 451, 452, 454 is VDIFF/2=2 V/2=1 V. In contrast, in the example from FIGS. 4 and 5, the average value of bus differential voltage VDIFF in data phase 453 is VDIFF/2=0 V.

Otherwise, in the third exemplary embodiment, bus system 1 is designed in the same way as described above for the first exemplary embodiment.

All of the above-described embodiments of devices 15, 35, 150, of user stations 10, 20, 30, 100 of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may be a communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30, 100 in bus system 1 of the exemplary embodiments is arbitrary. In particular, user station 20 in bus system 1 may be dispensed with. It is possible for one or more of user stations 10 or 30 or 100 to be present in bus system 1. It is possible for all user stations in bus system 1 to have the same design, i.e., for only user station 10 or only user station 30 or only user station 100 to be present.

What is claimed is:

1. A device for a serial bus system, comprising:
   a receiver configured to receive a signal from a bus of the bus system, in which bus system at least one first communication phase and one second communication phase are used for exchanging messages between user stations of the bus system, wherein for a message, bus states of the signal received from the bus in the first communication phase are different from bus states of the signal received in the second communication phase, the receiver being configured to generate a digital signal from the signal received from the bus and to output the signal to a communication control device which evaluates data contained in the digital signal, the receiver being configured to use a first reception threshold and a second reception threshold in each of the first and second communication phases for generating the digital signal, the second reception threshold having a negative voltage value.

2. The device as recited in claim 1, wherein the receiver is configured to use the second reception threshold, regardless of a communication phase in which the signal is received from the bus, and the receiver is configured to additionally use the first reception threshold in the first communication phase for generating the digital signal, and in the second communication phase to use a third reception threshold whose positive voltage value is less than a positive voltage value of the first reception threshold.

3. The device as recited in claim 1, wherein the bus states of the signal received from the bus in the first communication phase are generated with a different physical layer than the bus states of the signal received in the second communication phase.

4. The device as recited in claim 1, wherein in the first communication phase, bits of signals have a bit time that is greater by at least a factor of 10 than a bit time of bits that are driven in the second communication phase.

5. The device as recited in claim 1, wherein in the first communication phase, it is negotiated which of the user stations of the bus system in a subsequent second communication phase obtains, at least temporarily, exclusive, collision-free access to the bus.

6. The device as recited in claim 2, further comprising:
   a reception threshold adaptation device configured to evaluate the signal received from the bus with regard to a communication phase present at that time, and to switch the first reception threshold over to the third reception threshold or to switch the third reception threshold over to the first reception threshold, based on the result of the evaluation.

7. The device as recited in claim 6, wherein the reception threshold adaptation device switches the first reception threshold over to the third reception threshold when, after the first communication phase, in which no exclusive, collision-free access of a user station to the bus of the bus system is ensured, a switch is made over to a communication phase with the exclusive, collision-free access to the bus.

8. The device as recited in claim 6, wherein the reception threshold adaptation device is configured to carry out an average value formation of a differential voltage of two signals received from the bus in order to switch the first reception threshold over to the third reception threshold or to switch the third reception threshold over to the first reception threshold.

9. The device as recited in claim 1, further comprising:
a transmitter configured to transmit messages onto a bus of the bus system, the transmitter being configured to switch between a first operating mode and a second operating mode during transmission of the first and second communication phases of a message.

10. The device as recited in claim 9, wherein in the first operating mode, the transmitter is configured to generate a first data state as a bus state with different bus levels for two bus wires of a bus line, and a second data state as a bus state with the same bus level for the two bus wires of the bus line, and in the second operating mode, the transmitter is configured to generate the first and second data states as a bus state, respectively, with different bus levels for the two bus wires of the bus line.

11. A user station for a serial bus system, comprising:
a communication control device configured to control a communication of the user station with at least one other user station of the bus system; and
a device including a receiver configured to receive a signal from a bus of the bus system, in which bus system at least one first communication phase and one second communication phase are used for exchanging messages between user stations of the bus system, wherein for a message, bus states of the signal received from the bus in the first communication phase are different from bus states of the signal received in the second communication phase, the receiver being configured to generate a digital signal from the signal received from the bus and to output the signal to a communication control device which evaluates data contained in the digital signal, the receiver being configured to use a first reception threshold and a second reception threshold in each of the first and second communication phases for generating the digital signal, the second reception threshold having a negative voltage value.

12. The user station as recited in claim 11, wherein the communication control device is configured to transmit the signal to the device, and based on the signal transmitted from the communication control device, the communication control device being configured to switch the first reception threshold over to a third reception threshold or to switch the third reception threshold over to the first reception threshold.

13. A bus system, comprising:
a bus; and
at least two user stations connected to one another via the bus in such a way that they may communicate serially with one another, and of which at least one user station includes a user station including:
a communication control device configured to control a communication of the user station with at least one other user station of the bus system, and
a device including a receiver configured to receive a signal from a bus of the bus system, in which bus system at least one first communication phase and one second communication phase are used for exchanging messages between user stations of the bus system, wherein for a message, bus states of the signal received from the bus in the first communication phase are different from bus states of the signal received in the second communication phase, the receiver being configured to generate a digital signal from the signal received from the bus and to output the signal to a communication control device which evaluates data contained in the digital signal, the receiver being configured to use a first reception threshold and a second reception threshold in each of the first and second communication phases for generating the digital signal, the second reception threshold having a negative voltage value.

14. A method for communicating in a serial bus system, the method being carried out using a receiver configured to receive a signal from a bus of the bus system, in which bus system at least one first communication phase and one second communication phase are used for exchanging messages between user stations of the bus system, the receiving carrying out the following steps:
receiving a signal from the bus of the bus system, for a message, bus states of the signal received from the bus in the first communication phase being different from bus states of the signal received in the second communication phase;
generating a digital signal from the signal received from the bus; and
outputting the generated digital signal to a communication control device that evaluates data contained in the digital signal, the receiver using a first reception threshold and a second reception threshold in each of the first and second communication phases for generating the digital signal, the second reception threshold having a negative voltage value.

* * * * *